(12) United States Patent
Wang et al.

(10) Patent No.: US 8,139,281 B1
(45) Date of Patent: Mar. 20, 2012

(54) TUNABLE OPTICAL FILTER APPARATUS AND METHOD

(75) Inventors: Leah Wang, Fremont, CA (US); Anthony C. Kowalczyk, San Carlos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 283 days.

(21) Appl. No.: 12/690,922

(22) Filed: Jan. 20, 2010

Related U.S. Application Data

(60) Provisional application No. 61/153,262, filed on Feb. 17, 2009.

(51) Int. Cl.
G02F 1/01 (2006.01)
G02B 26/00 (2006.01)
G01C 19/70 (2006.01)
H01J 40/00 (2006.01)

(52) U.S. Cl. ........ 359/239; 359/260; 359/308; 356/475; 250/200; 250/201.1; 250/206; 250/215; 250/216; 250/227.27; 250/550; 250/552

(58) Field of Classification Search .................. 359/239, 359/260, 308; 356/475; 250/200, 200.1, 250/206.1, 215, 216, 227.27, 550, 552
See application file for complete search history.

(56) References Cited

U.S. PATENT DOCUMENTS

| | | | | |
|---|---|---|---|---|
| 4,272,825 A * | 6/1981 | Smithline et al. | ............ | 359/308 |
| 4,925,302 A | 5/1990 | Cutler | | |
| 6,647,211 B2 * | 11/2003 | Terahara et al. | ............ | 359/308 |
| 7,327,896 B1 * | 2/2008 | Singh et al. | ............ | 359/308 |
| 7,405,859 B2 * | 7/2008 | Takita | ............ | 359/308 |

* cited by examiner

Primary Examiner — Evelyn A. Lester
(74) Attorney, Agent, or Firm — McDemott Will & Emery LLP

(57) ABSTRACT

A tunable optical filter apparatus and method are disclosed. The apparatus may include a filter driver, a filter device, a detector device and a controller device. The filter driver generates a filter driver signal, including a dither signal. The controller device may be coupled to the detector device, the filter device and the filter driver. The controller device may receive the detector output signal and determine a ratio of the odd order harmonic signal to the even order harmonic signal with respect to the dither frequency. The controller device may also compare the ratio to a predetermined setpoint ratio and generate a control feedback signal for generating a new filter driver signal. The control feedback signal may be based on the comparison of the ratio of the odd order harmonic signal to the even order harmonic signal, to the predetermined setpoint ratio that corresponds to a desired filter operating frequency.

20 Claims, 14 Drawing Sheets

Detector device

TUNABLE OPTICAL FILTER APPARATUS AND METHOD

CROSS-REFERENCES TO RELATED APPLICATIONS

The present application claims the benefit of priority under 35 U.S.C. §119 from U.S. Provisional Patent Application Ser. No. 61/153,262, entitled "LOCKING TECHNIQUE FOR VERY NARROW TUNABLE OPTICAL FILTERS," filed on Feb. 17, 2009, which is hereby incorporated by reference in its entirety for all purposes.

STATEMENT REGARDING FEDERALLY SPONSORED RESEARCH OR DEVELOPMENT

Not applicable.

FIELD

The subject technology generally relates to optical filters, and more particularly to, tunable optical filter apparatus and method.

BACKGROUND

Optical filters may be desirable for use in applications such as channelization of microwave signals in the optical domain, optical or microwave signal aliasing, and ultra-dense optical communications. However, optical filters are subject to drifting instability due to a drift in their center frequency. The drifting instability of the optical filter varies and may depend on the underlying filter technology and components involved. Nevertheless, Heisenberg's uncertainty principle teaches that, fundamentally, as the filter bandpass gets narrower, a higher probability of drifting is expected. Drifting instability is undesirable in many applications including the above mentioned applications.

SUMMARY

In one aspect of the subject disclosure, a tunable optical filter apparatus is provided. The tunable optical filter apparatus may include a filter driver, a filter device, a detector device and a controller device. The filter driver may be configured to generate a filter driver signal. The filter driver signal may include a dither signal. The filter device may be coupled to and driven by the filter driver. The filter device may be configured to receive a filter input signal and the filter driver signal. The filter device may also be configured to generate a filter output signal based on the filter input signal and the filter driver signal. The filter input signal may include a reference optical signal and an optical input signal.

The detector device may be coupled to the filter device and the detector device may be configured to receive a detector input signal and to generate a detector output signal. The detector input signal may include at least a portion of the filter output signal and the detector output signal may be based on an odd order harmonic signal and an even order harmonic signal of the detector input signal based on a frequency of the dither signal.

The controller device may be coupled to the detector device, the filter device and the filter driver. The controller device may be configured to receive the detector output signal. The controller device may also be configured to determine a ratio of the odd order harmonic signal to the even order harmonic signal and to compare the ratio to a predetermined setpoint ratio. In addition, the controller device may be configured to generate a control feedback signal for generating a new filter driver signal. The control feedback signal may be based on the comparison of the ratio of the odd order harmonic signal to the even order harmonic signal, to the predetermined setpoint ratio.

In a further aspect of the disclosure, a tunable optical filter method is provided. The method may include generating a filter driver signal where the filter driver signal may include a dither signal. The method may also include receiving a filter input signal and the filter driver signal. The filter input signal may include a reference optical signal and an optical input signal. The method may further include generating a filter output signal based on the filter input signal and the filter driver signal. The method may include receiving a detector input signal where the detector input signal may comprise at least a portion of the filter output signal. The method may also include generating a detector output signal. The detector output signal may be based on an odd order harmonic signal and an even order harmonic signal of the detector input signal based on a frequency of the dither signal. The method may include receiving the detector output signal and determining a ratio of the odd order harmonic signal to the even order harmonic signal. The method may also include comparing the ratio to a predetermined setpoint ratio and generating a control feedback signal for generating a new filter driver signal. The control feedback signal may be based on the comparison of the ratio of the odd order harmonic signal to the even order harmonic signal, to the predetermined setpoint ratio.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology.

Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
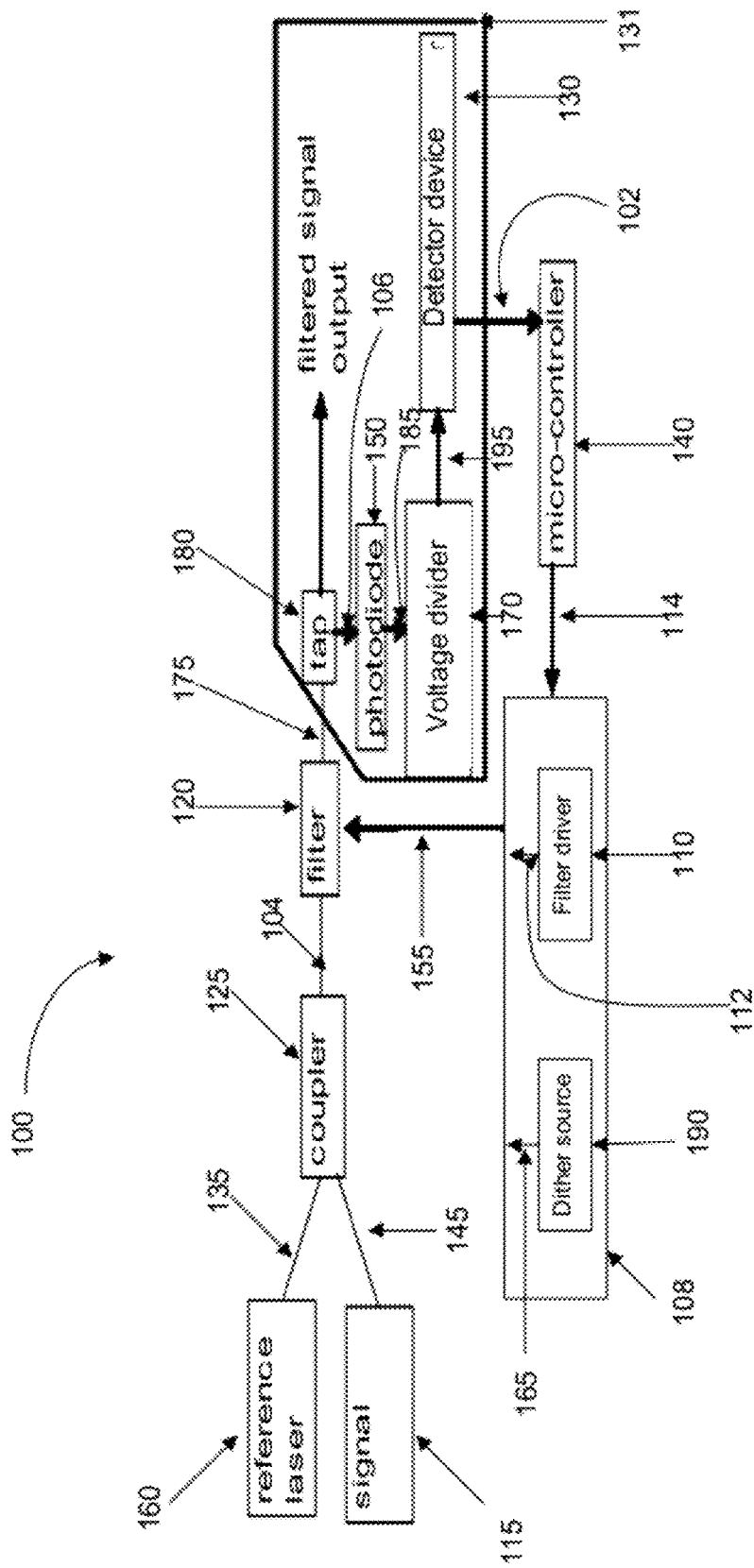
FIG. 1 is a conceptual block diagram illustrating an example of a tunable optical filter apparatus.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like or similar components may be labeled with identical element numbers for ease of understanding or it may indicated in the disclosure that one component may be an example of a different component.

Various locking techniques may be implemented to lock optical filters. In one aspect, a locking technique for locking sub-gigahertz (GHz), i.e., less than 1 GHz, bandwidth filters comprises an optical phase lock loop technique. In this implementation, a reference oscillator is mixed with a filter output via an optical phase modulator. The mixed signal is then input to a photodiode where the output from the photodiode may be fed back into a filter driver. The output from the photodiode may be related to a relative offset frequency between a filter and the reference oscillator. Since the optical phase lock loop technique relies on the relative phase between two signals, the feedback loop bandwidth may be limited. Accordingly, the optical phase lock loop technique may be limited to low frequency filters. Other filter locking techniques comprise a thermal temperature locking technique. However, temperature response can be very slow and lack absolute reference, making the temperature locking technique undesirable.

By way of illustration and not limitation, aspects of the subject disclosure describe a tunable optical filter apparatus and a tunable optical filter method. One aspect of the subject technology comprises a filter locking technique or implementation for narrow optical filters with bandpass below one gigahertz (i.e., sub-GHz). In some configurations, a low frequency electronic dithering method may be implemented to monitor the ratio between the fundamental signal (which may be sometimes referred to as a first order harmonic signal) and a second order harmonic signal of an optical output signal of a filter. The ratio may be used for generation of a feedback signal or parameter used to achieve reliable filter locking to a reference single frequency laser, reference locking laser or laser source. In other configurations, the filter locking technique can achieve a locking stability within 1% (+/−0.5%) of a 3-dB (i.e., power ratio in decibels) bandpass based on the linewidth of the laser source. Narrow linewidth (sub-GHz) optical filters can be the enabling technologies for realizing low SWaP (size, weight, and power) microwave channelizers in satellite communications. They may also be used in the digital communication industries to scale up network capacity.

The terms "first," "second," "first order" and "second order" may be sometimes referred to as 1st, 2nd, 1st order and 2nd order, respectively. The term "optical filter" may be sometimes referred to as a filter.

One approach to filter locking may comprise the use of a simple low frequency electronic dithering method to monitor the ratio between a first order and second order harmonic signals of an optical filter output signal to achieve reliable filter locking to a reference single frequency laser. This approach may not be limited by a feedback circuit bandwidth and may be inexpensive to implement.

Referring now to the illustrations, and more particularly to FIG. 1, an example of a tunable optical filter apparatus 100 according to one aspect of the subject technology is shown. In general, a tunable optical filter apparatus 100 may comprise, a filter drive signal device 108, a filter device 120 (e.g., tunable optical filter), a detector device 130 (e.g., harmonics detector) and a controller device 140, for example a microcontroller. The tunable optical filter apparatus 100 may also comprise a photodetector 150, a laser source 160, a voltage divider 170, a tap device 180, a signal source 115 and a coupler device 125. The filter drive signal device 108 may comprise a filter driver 110 and a dither source 190. In some configurations, the filter driver 110 and/or the dither source 190 may be independent of the filter drive signal device 108.

In one exemplary configuration, the laser source 160, (e.g., a reference locking laser, a reference laser or a reference single frequency laser) may be configured to generate a reference optical signal 135 and transmit the reference optical signal 135 to the filter device 120. The signal source 115 may be configured to generate an optical input signal 145 and to transmit the optical input signal 145 to the filter device 120. In some aspects, the laser source 160 and the signal source 115 may be coupled to the coupler device 125. The coupler device 125 may be configured to receive the reference optical signal 135 and the optical input signal 145. The coupler device 125 may also be configured to generate a coupler output signal or filter input signal 104, based on the reference optical signal 135 and the optical input signal 145. In some configurations, the coupler device 125 may be independent but coupled to the filter device 120. In other configurations, the coupler device 125 may be an integral part of the filter device 120.

Figure 2:
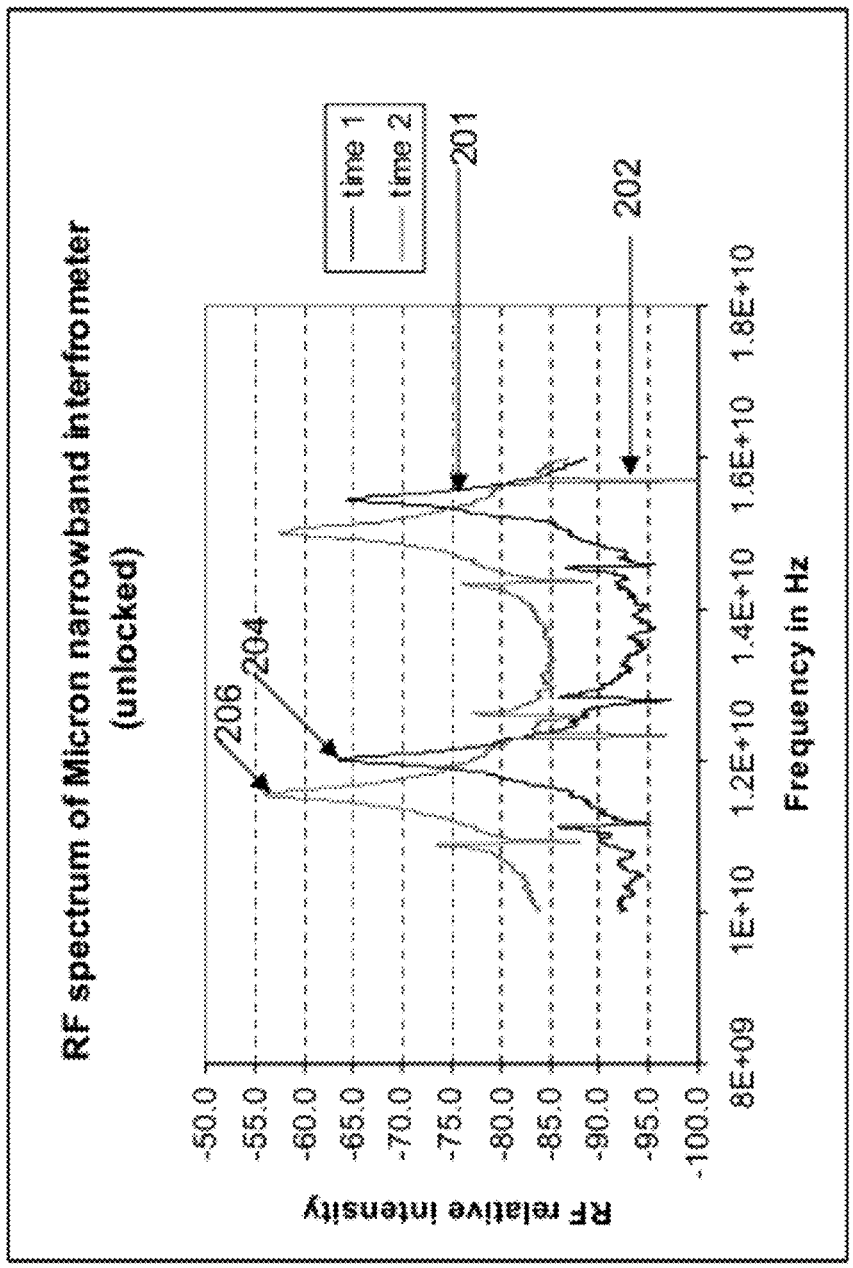
FIG. 2 is a diagram illustrating an example of an operational drift in a filter output signal.

The filter device 120 may be configured to receive the filter input signal 104 and to generate a filter output signal 175. The filter device 120 may be subject to drift in the center frequency as illustrated in FIG. 2. In particular, FIG. 2 is a diagram illustrating an example of an operational drift in the filter output signal 175 prior to implementation of the technique disclosed herein. The horizontal axis represents frequency in hertz (Hz) while the vertical axis represents the radio frequency relative intensity at the filter device output. Transfer function curve 201 may represent characteristics of the filter device 120 at time 1 (T1). Transfer function curve 202 may represent characteristics of the filter device 120 at time 2 (T2). Transfer function curves 201 and 202 illustrate a drift from the center frequency at time T1 (i.e., at point 204) to a center frequency at time T2 (i.e., at point 206).

Returning to FIG. 1, the tap device 180 may be configured to transmit a portion of the filter output signal 175, i.e., a tapped optical signal 106, to the photodetector 150. The photodetector 150 may comprise a photodiode and/or other light sensors. The tap device 180 may be an optical tap such as a fiber tap or an optical power splitter. The photodetector 150 may convert the tapped optical signal 106 into an electrical signal or input electrical signal 185, for example. The electrical signal 185 may be received at the detector device 130. In some aspects, the tunable optical filter apparatus 100 may also comprise a voltage divider 170. The voltage divider 170 may be coupled to the photodetector 150 and the detector device 130. In some configurations, some or all of the following may be included into a detection device 131: the tap device 180, the detector device 130, the voltage divider 170, and the photodetector 150. In another configuration, the detection device 131 may include other components.

In one aspect of the subject technology, the filter device 120 may be coupled to and driven by the filter drive signal device 108 and the tap device 180. The filter drive signal device 108 may comprise a dither device or source 190 and a filter driver 110. The dither source 190 may be configured to generate a dither signal 165 and the filter driver 110 may be configured to generate a drive signal 112. The term "dither signal" may be sometimes referred to as "dither tone," "dither signal," "dithering signal," "dither tone signal," "dithering tone," or a similar term. The filter device 120 may be configured to receive a feedback signal such as a filter driver signal 155, where the filter driver signal 155 comprises the dither signal 165 and the drive signal 112. In one aspect, the dither device 190 may provide the dither signal 165 to the filter driver 110, and the filter driver 110 may generate the filter driver signal 155 based on the dither signal 165. In another aspect, the dither source 190 generates a dither signal 165 and the filter driver 110 generates a drive signal 112. A filter driver signal 155 is then generated based on the drive signal 112 and the dither signal 165. In some configurations, the dither device 190 and the filter driver 110 are independent of each other. In other configurations, the dither device 190 and the filter driver 110 are integral devices. The filter device 120 may be configured to receive the filter input signal 104 and the filter driver signal 155 and to generate the filter output signal 175 based on the filter input signal 104 and the filter driver signal 155. In one exemplary configuration, the filter driver signal 155 comprises an electrical filter driver signal. In one aspect, the filter device 120 may comprise a Fabry-Perot Etalon, Fiber Bragg Grating, Ring Resonator, other filter technologies and any combination thereof.

Figure 3:
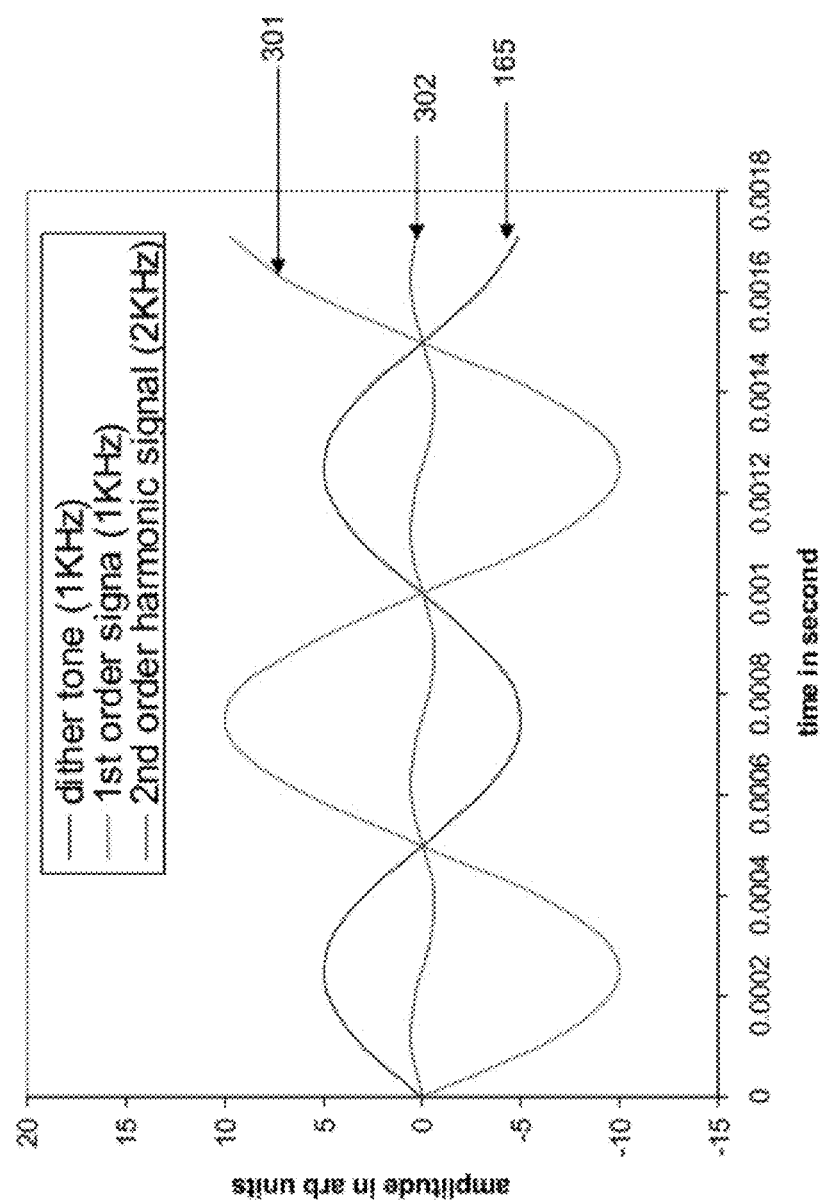
FIG. 3 is an example of a plot illustrating filter output harmonics in relation to dither tone.

In some aspects, the filter center frequency may be locked to a reference single frequency of the laser source 160, for example, by monitoring the photodiode 150 outputs at fundamental (i.e., first order harmonic) dithering frequency and second order harmonic frequency. For a filter device 120 such as a Gaussian or Lorenzian filter or a convolution of both, the photodiode signal at fundamental dithering frequency may disappear when the filter center frequency overlaps with the reference optical signal of the laser source 160. Therefore, filter locking to the reference laser 160 can be achieved by minimizing the photodiode signal at dithering frequency. FIG. 3 is an example of a plot illustrating filter output harmonics in relation to the dither tone 165. In particular, the plot represents the relationship between the dither tone 165 and the filter output harmonics at 20 MHz offset from a reference laser position in the time domain. The horizontal axis represents time in seconds while the vertical axis represents amplitude in arbitrary units. In this example, the amplitude of the first order harmonic signal 301 is larger than the amplitude of the second order harmonic signal 302 at 20 MHz offset point. At much smaller frequency offset, the first order harmonic signal 301 will be smaller than the second order harmonic signal 302. In addition, the frequency of the second order harmonic signal 302 is twice the frequency of the first order harmonic signal 301.

In other aspects, a filter device 120 may be locked at a certain offset (i.e., offset point, filter locking offset point or offset frequency) from the reference laser or reference frequency. The ratio of the first order harmonic signal to the second order harmonic signal may be used to set the offset point because this ratio may be linearly proportional to the offset frequency. The ratio may also be independent of input power level to the filter device 120. Arbitrary offset locking can be achieved with high precision using this filter locking technique, for example.

A reference optical signal 135 of the laser source 160 may be combined with the optical input signal 115 at the filter device input. A small amount or portion of the filter output signal 175 may be tapped off by the tap device and inputted to the photodiode 150. The photodiode 150 may be coupled to the tap device 180 and the voltage divider 170. The photodiode output 185 may be converted by the voltage divider 170 (e.g., analog voltage divider) to a voltage divider output signal or a detector input signal 195. The voltage divider 170 may comprise a logarithmic op-amp configured to perform inversion of the input electrical signal 185. Thus, the voltage divider can be configured to invert the input electrical signal 185, and send the inverted signal as the detector input signal 195 to the detector device 130. The detector device 130 may be configured to detect the first order and second order harmonic signals of the detector input signal 195 with respect to the dithering frequency of the dither tone 165. The detector device 130 may be coupled to the voltage divider 170 and the controller device 140 such as a micro-controller. The detector device 130 may be configured to generate a detector device signal 102 comprising the detected first and second order harmonic signals and to input the detector device signal 102 to the controller device 140.

The controller device 140 may be coupled to the filter drive signal device 108 and configured to receive the detector device signal 102 and to determine a ratio (harmonic ratio) of the first order harmonic signal to the second order harmonic signal. The controller device 140 may be further configured to compare the ratio of the first order harmonic signal to the second order harmonic signal to a predetermined setpoint ratio. The predetermined setpoint ratio or predetermined filter locking setpoint ratio may be determined based on theoretical values or experimental calibration values of a first and second order harmonics of a filter output signal. The controller device 140 can be configured to generate instructions or a micro-controller signal 114 to the filter driver 110 to instruct the filter driver 110 to generate the appropriate feedback signal such as the filter driver signal 155 based on the comparison of the harmonic ratio to the predetermined setpoint ratio. Thus, the harmonic ratio may be used for the generation of a feedback signal or parameter such as the filter driver signal 155 to achieve reliable filter locking to the reference laser source frequency.

In some configurations, the controller device may comprise a comparator to perform the comparison of the harmonic ratio to the predetermined setpoint ratio. In the event the comparator is not equal, i.e., the harmonic ratio is not equal to the predetermined setpoint ratio, the controller device 140 may iteratively generate instructions to the filter driver 110 to generate new filter driver signals until the comparator becomes equal.

Figure 4:
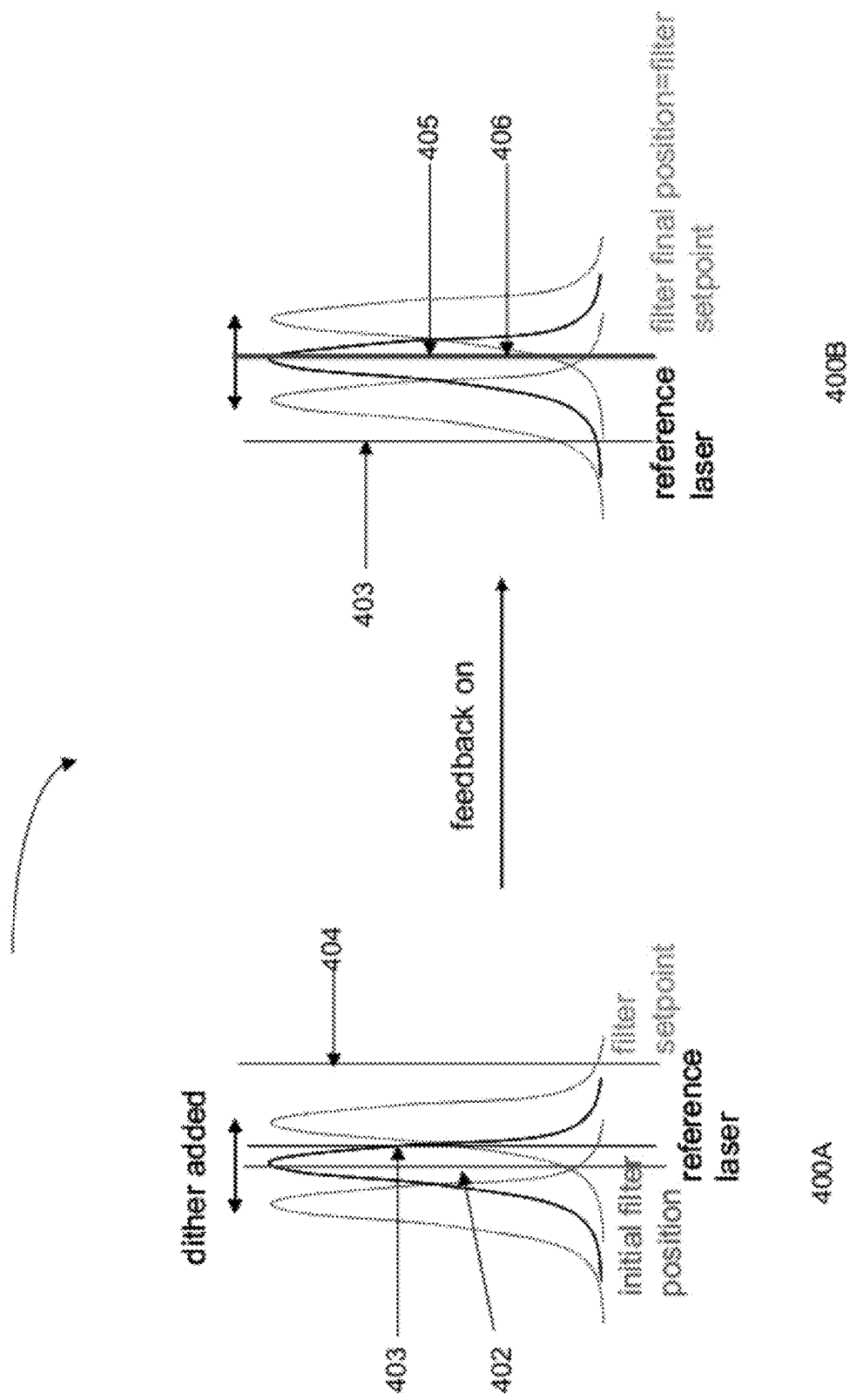
FIG. 4 illustrates exemplary plots demonstrating filter locking based on feedback signal or parameter described in the subject technology.

FIG. 4 illustrates exemplary plots demonstrating filter locking based on feedback signal or parameter described in the subject technology. Diagram 400A illustrates an initial filter output position 402, a reference laser position 403 and the desired filter setpoint position 404 based on a dither signal prior to the application of the feedback. Diagram 400B represents filter position after the application of the feedback parameter or signal. In this configuration, the final filter output position 405 is locked at the desired filter setpoint position 406 at an offset from the reference laser position 403.

One aspect of the subject technology comprises filter device 120 such as a narrow bandpass filter with a Lorenzian lineshape. The transfer function of the filter device 120 can be expressed by Lorenzian distribution function:

$$T = \frac{b}{(v - v_0)^2 + a^2}, \quad (1)$$

where a and b are the constants defining the filter device profile. $v$ is the frequency of a filter input signal 104 (e.g., input light) to the filter device 120, and $v_0$ is the center frequency of the filter device 120.

A dither tone or dithering signal 165 may be applied to the filter driver 110 such that $v_0' = v_0 + v_d \sin \omega t$, and the transfer function becomes $$T = \frac{b}{(v - v_0 - v_d \sin \omega t)^2 + a^2}, \quad (2)$$

where $v_d$ is the amplitude of the dithering signal 165, $\omega$ is the dithering frequency and t is a function of time. For a laser source 160 such as a reference single frequency laser with frequency $v_L$ and intensity I, the intensity at the filter device output $I_{out}$ becomes $$I_{out} = \frac{b \cdot I}{(v_L - v_0 - v_d \sin \omega t)^2 + a^2}, \quad (3)$$

$I_{out}$ can be inverted and a trigonometric conversion to equation (3) can be applied, resulting in the following equations:

$$\frac{1}{I_{out}} = \frac{1}{bI}(((v_L - v_0)^2 - 2v_d(v_L - v_0) \sin \omega t + v_d^2 \sin^2 \omega t) + a^2)$$

$$= \frac{1}{bI} \cdot \left(((v_L - v_0)^2 - 2v_d(v_L - v_0) \sin \omega t + v_d^2 \cdot \frac{1}{2}(1 - \cos 2\omega t)\right) + a^2\right)$$

$$= \frac{1}{bI} \cdot \left((v_L - v_0)^2 + a^2 + v_d^2/2 - 2v_d(v_L - v_0) \sin \omega t + \frac{1}{2}v_d^2 \cos 2\omega t\right)$$

The following equations derived from the above equations include the $1/I_{out}$ signal powers of the first order harmonic signal, the $1/I_{out}$ signal powers of the second order harmonic signal and the harmonic ratio r between them:

$$\left(\frac{1}{I_{out}}\right)_{1st} = \frac{2}{bI} \cdot v_d(v_L - v_0); \quad (4)$$

$$\left(\frac{1}{I_{out}}\right)_{2nd} = \frac{1}{2bI} \cdot v_d^2;$$

$$r = \frac{\left(\frac{1}{I_{out}}\right)_{1st}}{\left(\frac{1}{I_{out}}\right)_{2nd}} = \cdot \frac{(v_L - v_0)}{v_d}$$

The harmonic ratio r of fundamental or first order harmonic signal to the second order harmonic signal can be independent of filter input signal power, which includes both the optical input signal power and the reference optical signal power. The harmonic ratio may be linearly proportional to the frequency offset between the filter device center frequency and reference laser frequency of the laser source 160 via dithering amplitude of the dither tone 165. In order to lock the filter device 120 at the reference laser frequency, i.e., $v_L = v_0$, the fundamental or first order harmonic signal can be minimized to near zero. In order to lock the filter device 120 at a specific offset point to the laser source 160, a pre-calibration may be required such that the linear slope can be experimentally determined accurately by linear interpolation of a few experimental data point.

Figure 5:
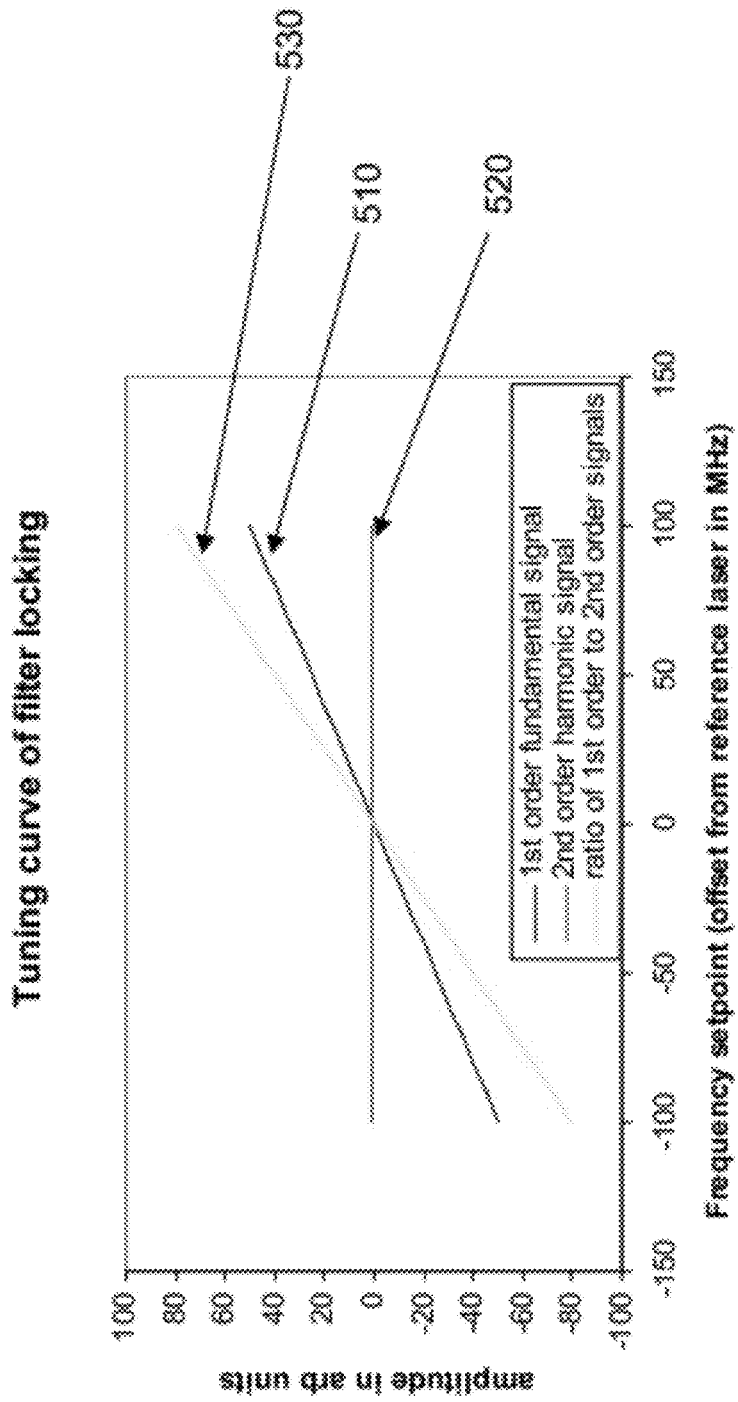
FIG. 5 is an example of a plot illustrating a tuning curve as a function of frequency setpoint expressed as the offset from the reference laser in the frequency domain.

FIG. 5 is an example of a plot illustrating a tuning curve as a function of frequency setpoint expressed as the offset from the reference laser in the frequency domain. In particular, FIG. 5 illustrates the $1/I_{out}$ signal power of the first order harmonic signal, represented by line 510, the $1/I_{out}$ signal power of the second order harmonic signal, represented by line 520 and the harmonic ratio r, represented by line 530. The horizontal axis of the plot represents frequency setpoint expressed as the offset from the reference laser in megahertz (MHz). The vertical axis represents amplitude in arbitrary units. The second order harmonic signal may be independent of frequency offset, as predicted by equation 4. On the other hand, the $1/I_{out}$ signal power at first order harmonic and the harmonic ratio are both linearly proportional to frequency offset as illustrated in FIG. 5.

Referring to FIG. 1, the controller device 140, can perform the pre-calibration to determine an experimental or calibrated linear slope. The calibrated linear slope with the known linear relationship can be used to match the desired offset frequencies to the corresponding ratios with high accuracy. The high linearity and sensitivity of the harmonic ratio r as a function of frequency offset to the reference frequency makes the harmonic ratio an effective feedback parameter. The sign of the ratio r determines the sign of the offset to the reference laser frequency, i.e., positive r yields positive offset and negative r yields negative offset with respect to the reference frequency. The locking accuracy may also depend on the linewidth of the laser source 160 where the reference frequency is defined. The reference frequency is better defined with narrower linewidth laser than with a wider linewidth laser. For example, a filter locking controller was constructed and experimentally validated on three Fabry-Perot filters with 1 GHz, 25 MHz, and 1 MHz 3 dB bandpass respectively. In order to quantify the locking stability dependence on reference laser linewidth, the 1 GHz bandpass filter was locked to a distributed feedback (DFB) laser with linewidth of 25 MHz and an external cavity laser with linewidth of 0.1 MHz for comparison.

Figure 6A:
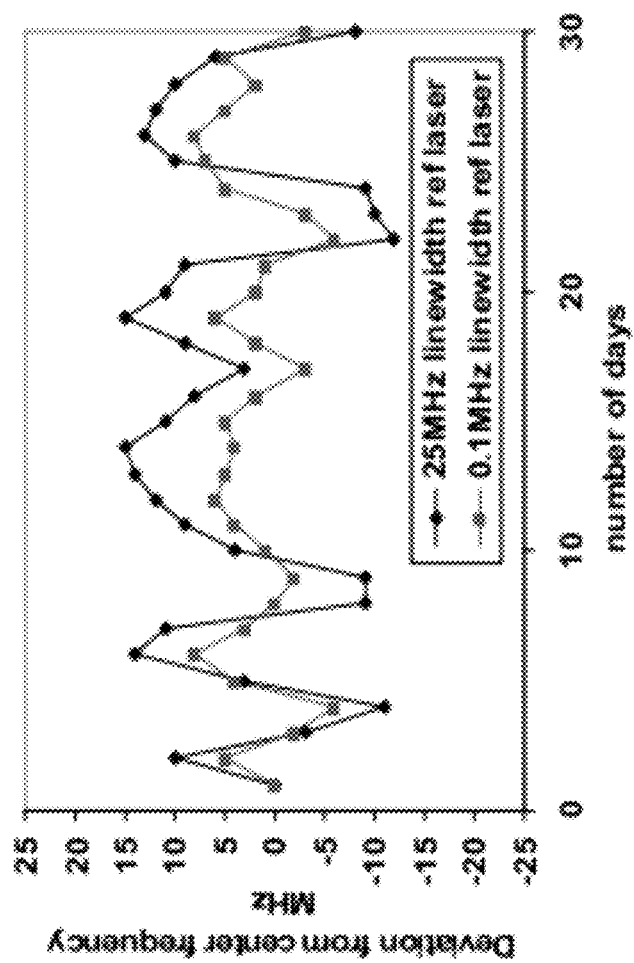
FIG. 6A is an example of a graph illustrating locking stability or accuracy of a 1 GHz bandpass filter monitored experimentally over a time period of one month.

FIG. 6A is an example of a graph illustrating locking stability or accuracy for the 1 GHz bandpass filter monitored experimentally over a time period of one month. In particular, FIG. 6A shows the filter locking stability over a one-month period with respect to the DFB laser with linewidth of 25 MHz and that of the external cavity laser with linewidth of 0.1 MHz. The horizontal axis of FIG. 6A represent the number of days and the vertical axis represent the deviation from the center frequency in MHz. By locking to the DFB laser with linewidth of 25 MHz, a locking stability of 2.5% of bandpass was demonstrated, while by locking to the external cavity laser with linewidth of 0.1 MHz, a locking stability of 1% of bandpass was demonstrated. In some configurations, better stability can be achieved with further optimization of a control loop. Further optimization may be accomplished by, for example, iteratively implementing the forgoing technique to continuously provide an optimum feedback signal, such as the filter driver signal, to the filter device.

Figure 6B:
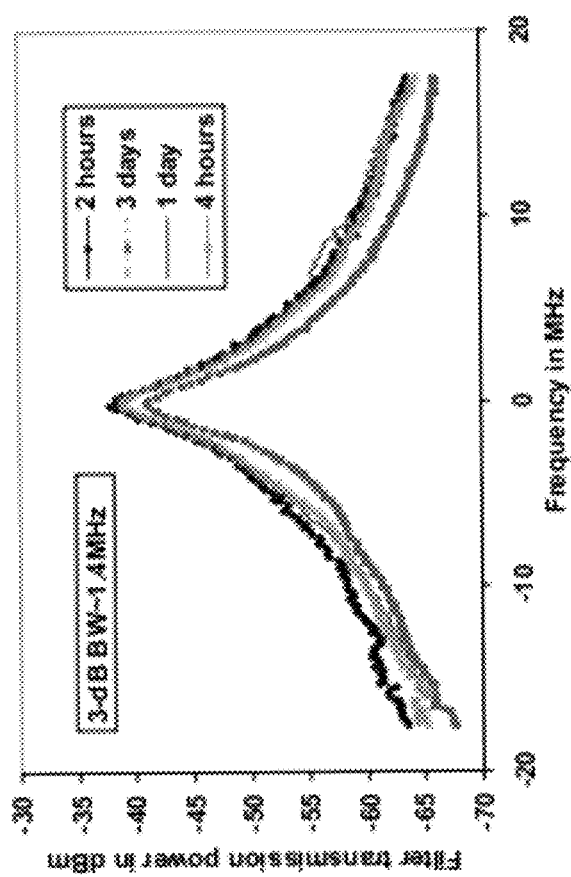
FIG. 6B is an example of a graph illustrating locking stability or accuracy of a one megahertz (MHz) bandpass filter over a time period of three days.
Figure 6C:
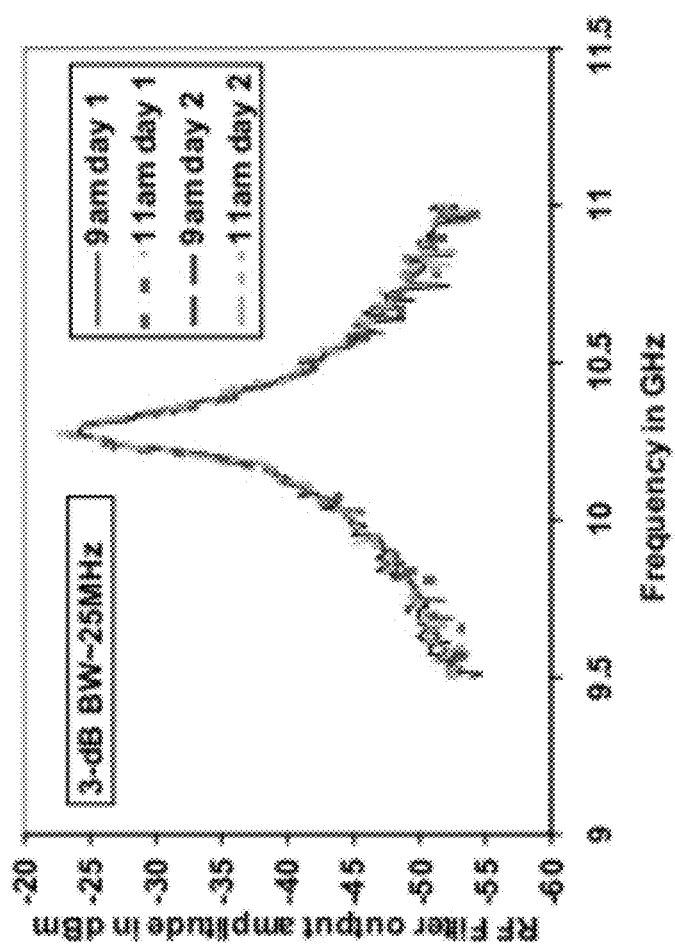
FIG. 6C is an example of a graph illustrating locking stability or accuracy of a 25 MHz bandpass filter over a time period of one day.

FIG. 6B and FIG. 6C are exemplary plots illustrating the filter locking stability over time for 25 MHz and 1 MHz bandpass filters respectively using a 0.1 MHz linewidth reference laser. The horizontal axis of FIG. 6B represent frequency in MHz while the horizontal axis of FIG. 6C represents frequency in GHz. The vertical axis of FIG. 6B and FIG. 6C both represent a filter output (e.g., radio frequency filter output) amplitude in dBm (i.e., output power in decibels). The filter locking stability for the 25 MHz bandpass filter was measured at intervals over a one day period. The filter locking stability for the 1 MHz bandpass filter was measured at intervals over a three day period. A locking stability within 1% of 3 dB bandpass was achieved for both the 25 MHz and 1 MHz bandpass filters.

Figure 7:
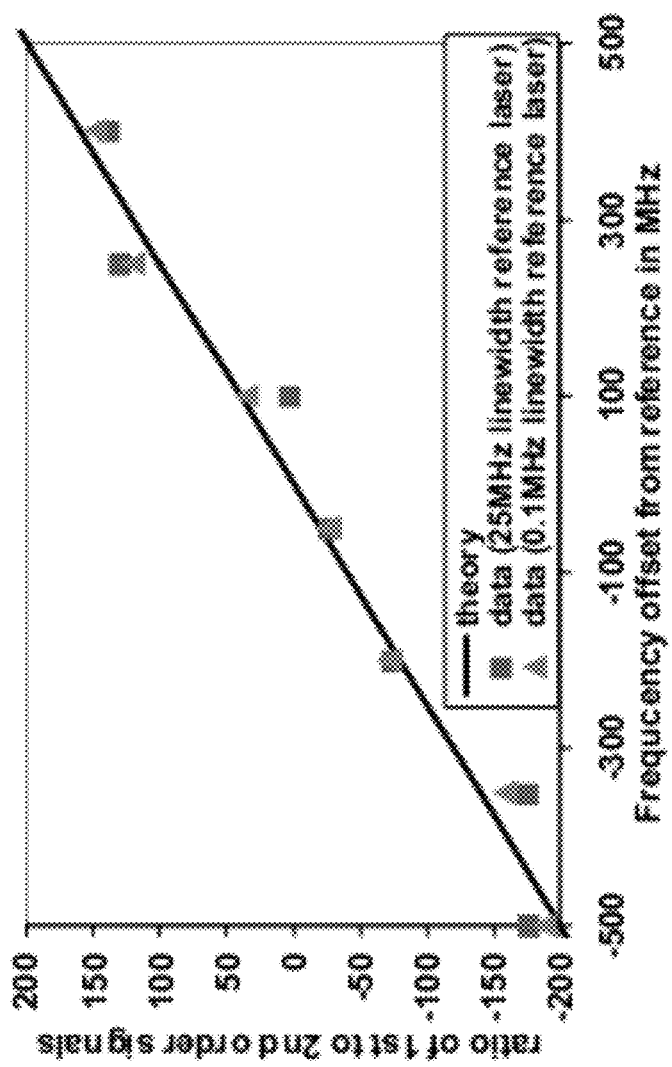
FIG. 7 is a graph illustrating an exemplary comparison of experimental and theoretical data, for the ratio of a fundamental output signal to a second order harmonic output signal as a function of frequency offset from the reference laser.

FIG. 7 is a graph illustrating an exemplary comparison of experimental and theoretical data, for the ratio of a fundamental output signal to a second order harmonic output signal as a function of frequency offset from the reference laser. In particular, FIG. 7 is a comparison between experimental and theoretical data for the ratio of a fundamental or first order harmonic output signal to a second order harmonic output signal as a function of the frequency offset between filter device 120 and reference laser 160. The horizontal axis of the graph represents frequency offset from the reference frequency in MHz. The vertical axis of the graph represents the ratio of the first order harmonic signal to the second order harmonic signal. The experimental data using the 25 MHz linewidth reference laser show greater deviation from the perfect linearity predicted by theory while the experimental data using 0.1 MHz linewidth reference laser show lesser deviation. Further optimization of the control loop or feedback loop may be accomplished by, for example, iteratively implementing the forgoing technique to continuously provide an optimum feedback signal, such as the filter driver signal 155, to the filter device 120.

Figure 8:
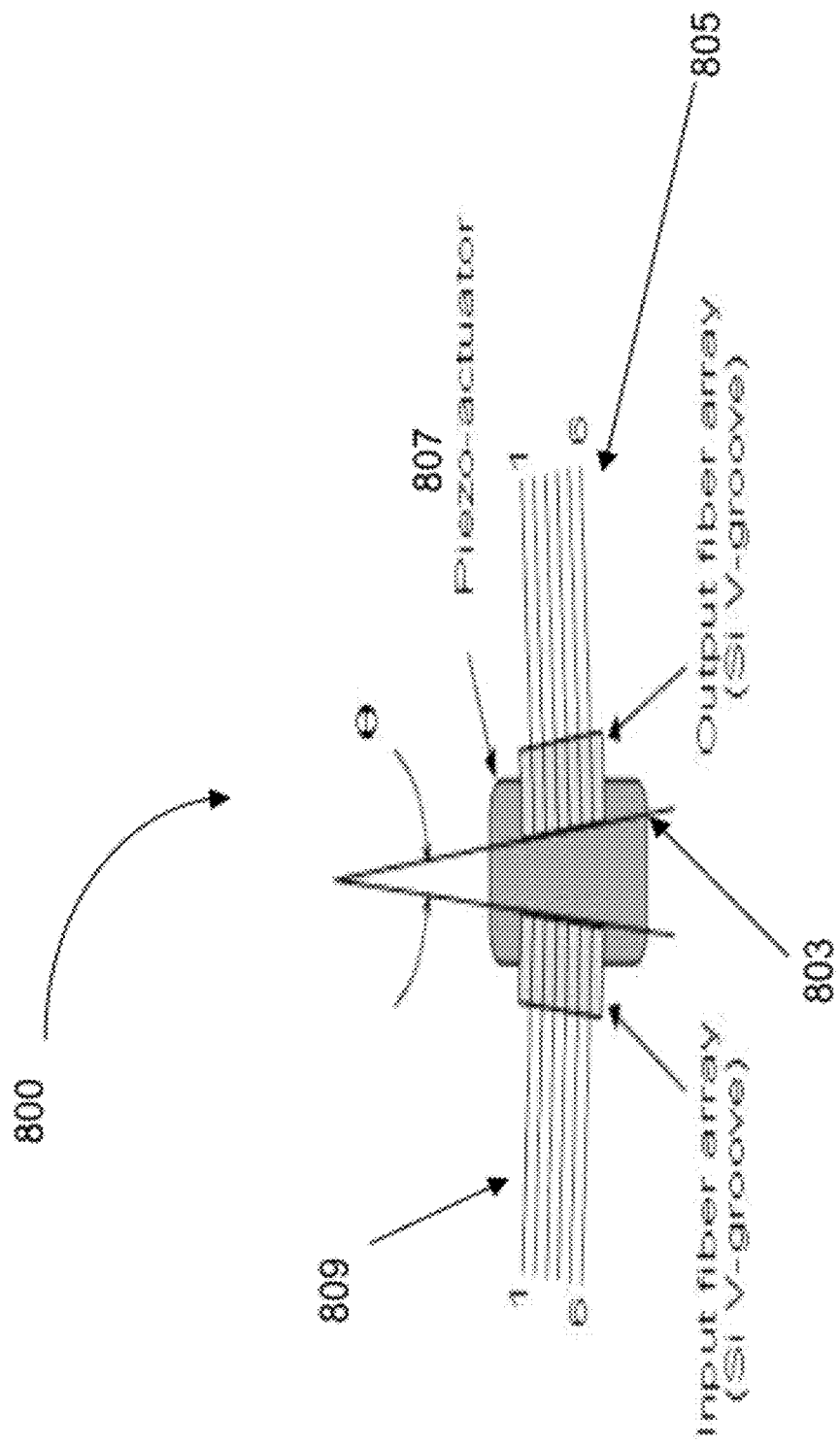
FIG. 8 is an example of a multi-port channelizer based on Fiber Fabry-Perot filter technology.

Some aspects of the subject technology may be applicable to channelizer applications. FIG. 8 shows an illustrative view of a fiber Fabry-Perot filter 800 in an arrayed geometry. Fiber Fabry-Perot filters (etalons) may be made by placing an air gap between input and output fibers 809 and 805 respectively. The transmission properties of the filter 800 in the array geometry result from adjusting the spatial separation between the fibers. Typically, the fiber separation is about five micrometers or less. Filter resonances are highly dependent on fiber separation and a precise control mechanism. Piezoelectric actuation has been successfully implemented to lock filter properties on the Fabry-Perot filter 800, for example.

Figure 9:
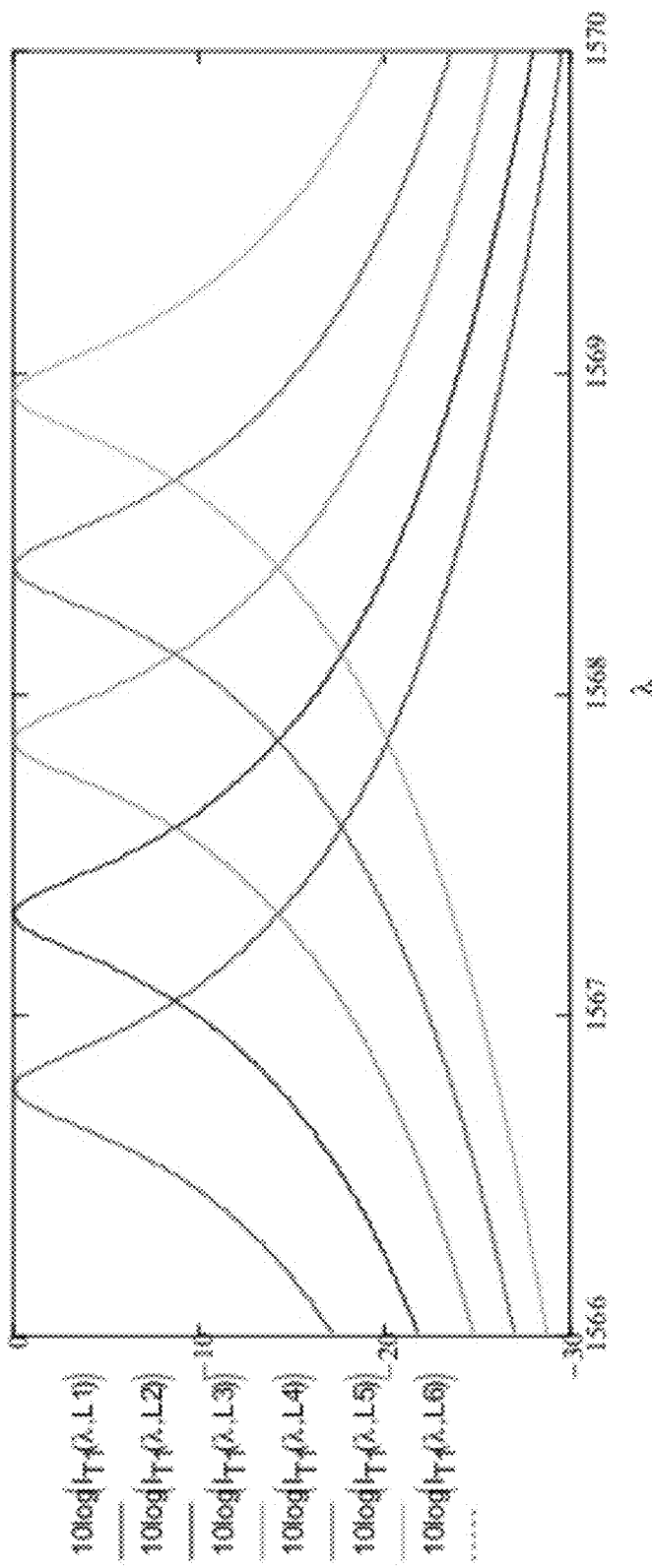
FIG. 9 is an example of a graph illustrating fibers 2-5 of the multi-port channelizer of FIG. 8, locked to adjacent filter resonances based on a locked filter resonance of fiber 1.

In one aspect of the subject technology, an array of input and output fibers 809 and 805 respectively, are physically terminated in a common Silicon V-groove 803. In some configurations, the input and output fibers 809 and 805 are positioned with a small angular offset θ between them such that each fiber in the V-block or V-groove 803 may have a slightly different spatial separation. The narrower the angle or offset angle θ, the closer the adjacent filter resonances. V-grooves 803 may be attached to a piezoelectric actuator 807 so that all channels lock or float with respect to each other. One advantage of such radio frequency (RF) channelization application, can be that the laser carrier may be adjusted and locked to a single fiber, for example fiber 1, and all the other fibers may automatically be locked to adjacent filter resonances (i.e., RF channels) as shown in FIG. 9. In particular, FIG. 9 is an example of a graph illustrating fibers 2-5 of the multi-port channelizer of FIG. 8, locked to adjacent filter resonances based on a locked filter resonance of fiber 1. The vertical axis represents the relative amplitude of the filter output signal at the output fibers 805 (i.e., fiber 2 to 6). The horizontal axis represents the wavelength of the filter output signals at the output fibers. Fibers 2-5 of the multi-port channelizer are locked to adjacent filter resonances relative to the locked filter resonance of fiber 1. In some configurations, the fibers may be configured to channelize single side band (SSB) modulators and the carrier may be assigned to fiber 1. In other configurations, a double sideband operation may be implemented, where the carrier can be aligned to the center fiber and a lower/upper sideband detected in respective fibers ports adjacent to the carrier.

Figure 10:
FIG. 10 and FIG. 11 each illustrates an example of a tunable optical filter locking process according to one configuration of the subject technology.

FIG. 10 illustrates an example of a tunable optical filter locking process according to one configuration of the subject technology. With concurrent reference to FIG. 1 and FIG. 10, the following describes an exemplary aspect of the subject technology. The process starts at operation 1000 where an initial filter locking setpoint can be determined. In operation 1002, a filter driver signal comprising a driver signal and a dither signal may be received. In operation 1004, the reference laser signal and the optical input signal may be combined. In operation 1006, the combined reference laser signal and the optical input signal may be filtered to produce a filter output signal. The process then continues to operation 1008 where the filter output signal may be tapped and converted to an electrical signal. In operation 1010, the tapped filter output signal may be inverted. In operation 1012, a first order and second order harmonic signals may be detected from the tapped filter output signal. In operation 1014, a ratio of the first order harmonic signal to the second order harmonic signal may be determined. The process then continues to operation 1016 where the ratio is compared with a pre-calibration ratio (or a predetermined ratio for the setpoint or a predetermined setpoint ratio). In operation 1018, an updated or new filter driver signal may be generated. The process may return to operation 1002 and proceed through to operation 1018 for iterative adjustment of the locking accuracy of the filter device.

Figure 11:
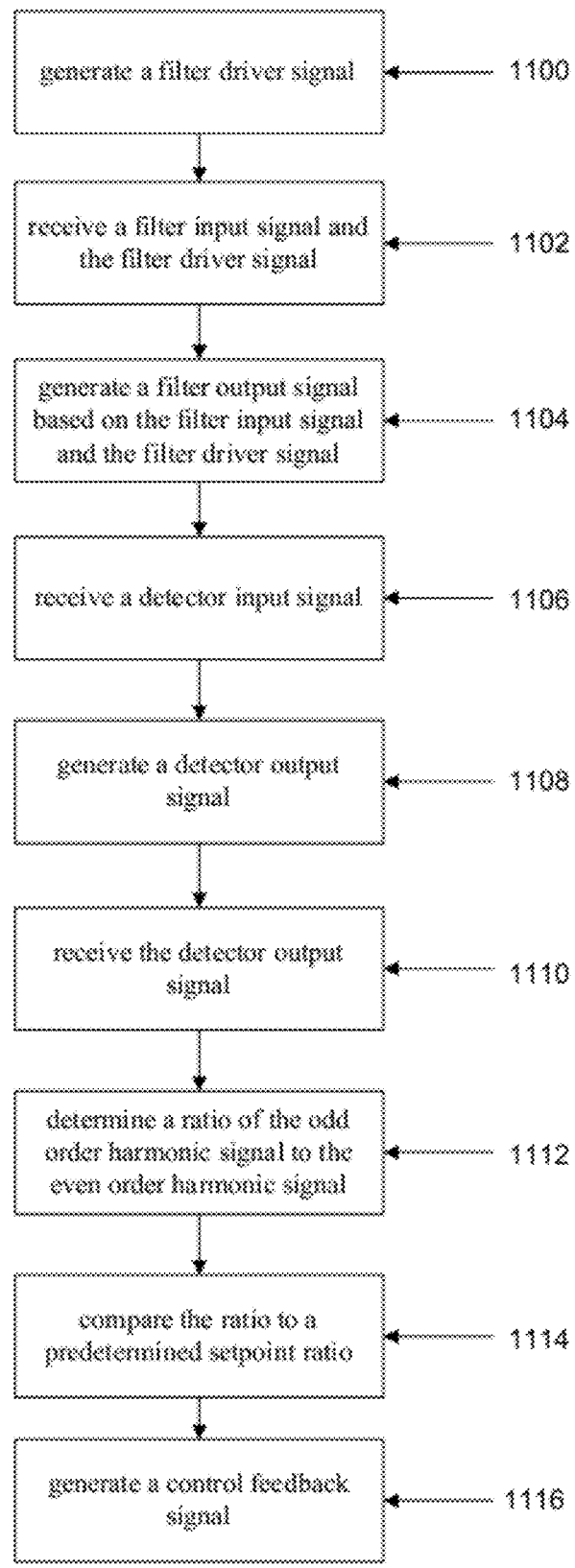

FIG. 11 illustrates another example of a tunable optical filter locking process according to one configuration of the subject technology. With concurrent reference to FIG. 1 and FIG. 11, the following describes an exemplary aspect of the subject technology. The process starts at operation 1100 where a filter driver signal comprising a driver signal and a dither signal may be generated. In operation 1102, a filter input signal and the filter driver signal may be received. The filter input signal comprises a reference optical signal and an optical input signal. In operation 1104, a filter output signal based on the filter input signal and the filter driver signal may be generated. In operation 1106, a detector input signal may be received. The detector input signal may comprise at least a portion of the filter output signal. The process then continues to operation 1108 where a detector output signal may be generated. The detector output signal may be based on an odd order harmonic signal and an even order harmonic signal of the detector input signal that is based on the frequency of the dither signal. In operation 1110, the detector output signal may be received. In operation 1112, a ratio of the odd order harmonic signal to the even order harmonic signal may be determined. In operation 1114, the ratio may be compared to a predetermined setpoint ratio. The process then continues to operation 1116 where a control feedback signal may be generated. The control feedback signal may be for generating a new filter driver signal. The control feedback signal may be based on the comparison of the ratio of the first order signal to the second order signal, to the predetermined setpoint ratio. The process may return to operation 1100 and proceed through to operation 1116 for iterative adjustment of the locking accuracy of the filter device.

Figure 12:
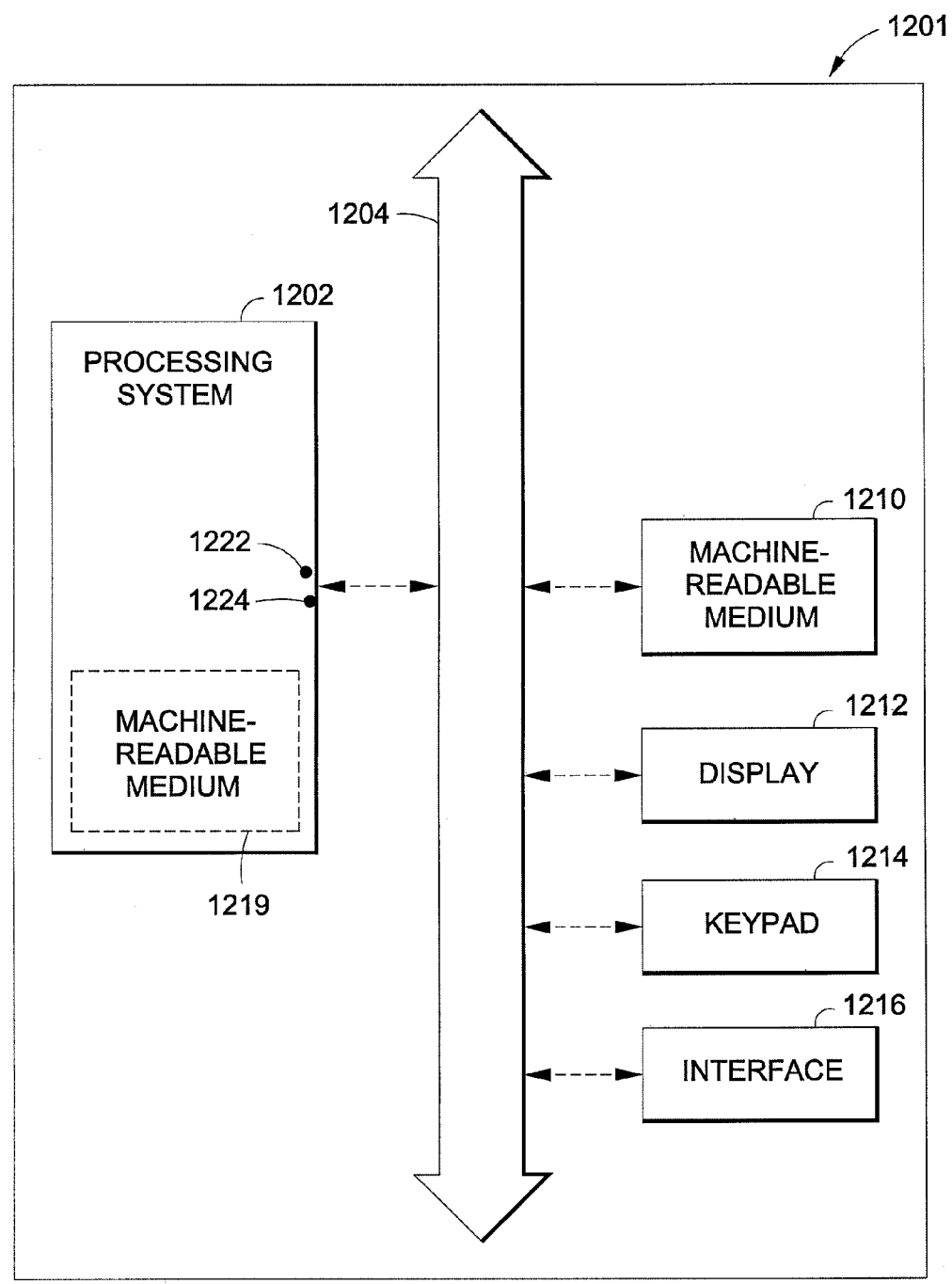
FIG. 12 illustrates a system level example of a tunable optical filter locking implementation.

FIG. 12 is a conceptual block diagram illustrating an example of a system. A system 1201 may be, for example, a microcontroller 140 in FIG. 1. The system 1201 includes a processing system 1202. The processing system 1202 is capable of communication with various components (e.g., 1210, 1212, 1214, 1216) through a bus 1204 or with other structures or devices. It should be understood that communication means other than busses can be utilized with the disclosed configurations.

The processing system 1202 may include a general-purpose processor or a specific-purpose processor for executing instructions and may further include a machine-readable medium 1219, such as a volatile or non-volatile memory, for storing data and/or instructions for software programs. The instructions, which may be stored in a machine-readable medium 1210 and/or 1219, may be executed by the processing system 1202 to control and manage access to the various networks, as well as provide other communication and processing functions. The instructions may also include instructions executed by the processing system 1202 for various user interface devices, such as a display 1212 and a keypad 1214. The processing system 1202 may include an input port 1222 and an output port 1224. Each of the input port 1222 and the output port 1224 may include one or more ports. The input port 1222 and the output port 1224 may be the same port (e.g., a bi-directional port) or may be different ports.

The processing system 1202 may be implemented using software, hardware, or a combination of both. By way of example, the processing system 1202 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 1219) may include storage integrated into a processing system, such as might be the case with an ASIC. Machine-readable media (e.g., 1210) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 1202. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. In one aspect, a machine-readable medium is a machine-readable storage medium or a computer-readable storage medium. Instructions can be, for example, a computer program including code.

An interface 1216 may be any type of interface and may reside between any of the components shown in FIG. 12. An interface 1216 may also be, for example, an interface to one or more external devices (e.g., filter drive signal device 108, or an Internet network interface). An interface 1216 may be used to receive and/or transmit information. A functionality implemented in a processing system 1202 may be implemented in a portion of a machine-readable medium 1210, a portion of a display 1212, a portion of a keypad 1214, or a portion of an interface 1216, and vice versa While the previous description has been described in terms of a feedback signal based on a ratio of a first order fundamental signal and a second order harmonic signal, another aspect of the subject disclosure may be described as using a ratio of an odd order harmonic signal and an even order harmonic signal. A ratio of an odd order harmonic signal and an even order harmonic signal may include the use of a first order fundamental signal and a second order harmonic signal as well as the use of other harmonic signals. For example, an even order harmonic signal may be one or more of the following: a second order harmonic signal, a fourth order harmonic signal, a sixth order harmonic signal, or an n order harmonic signal where n represents an even number. An odd order harmonic signal may be one or more of the following: a first order fundamental signal, a third order harmonic signal, a fifth order harmonic signal, or an n+1 order harmonic signal. A ratio may be determined, for example, from a first order fundamental signal used in conjunction with a fourth order harmonic signal. As another example, a second order harmonic signal may be used in conjunction with a third order harmonic signal to produce a ratio for the feedback signal. As another example, a ratio may be determined from a third order harmonic signal and a fourth order harmonic signal. The detector device 130 may be attuned to provide the desired odd order harmonic signal and the desired even order harmonic signal.

The foregoing description is provided to enable a person skilled in the art to practice the various configurations described herein. While the present subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A tunable optical filter apparatus comprising:
a filter driver configured to generate a filter driver signal, the filter driver signal comprising a dither signal;
a filter device coupled to the filter driver, the filter device configured to receive a filter input signal and the filter driver signal, the filter device configured to generate a filter output signal based on the filter input signal and the filter driver signal, the filter input signal comprising a reference optical signal and an optical input signal;
a detector device coupled to the filter device, the detector device configured to receive a detector input signal and to generate a detector output signal, the detector input signal comprising at least a portion of the filter output signal, the detector output signal based on an odd order harmonic signal and an even order harmonic signal of the detector input signal based on a frequency of the dither signal; and
a controller device coupled to the detector device, the filter device and the filter driver, the controller device configured to receive the detector output signal, the controller device configured to determine a ratio of the odd order harmonic signal to the even order harmonic signal, to compare the ratio to a predetermined setpoint ratio and to generate a control feedback signal for generating a new filter driver signal, the control feedback signal based on the comparison of the ratio of the odd order harmonic signal to the even order harmonic signal, to the predetermined setpoint ratio.

2. The apparatus of claim 1, further comprising a laser source configured to generate the reference optical signal.

3. The apparatus of claim 1, wherein the filter driver signal comprises an electrical filter driver signal.

4. The apparatus of claim 1, wherein the filter device comprises one of a Fabry-Perot Etalon, Fiber Bragg Grating, Ring Resonator and any combination thereof.

5. The apparatus of claim 1, further comprising a coupler device configured to combine the reference optical signal and the optical input signal.

6. The apparatus of claim 1, further comprising a photodetector configured to receive the portion of the filter output signal and to convert the portion of the filter output signal to an electrical output signal.

7. The apparatus of claim 6, further comprising a voltage divider configured to receive the electrical output signal, and to invert the electrical output signal.

8. The apparatus of claim 1, further comprising a signal source configured to generate the optical input signal.

9. The apparatus of claim 1, further comprising a dither source configured to generate the dither signal.

10. The apparatus of claim 1, wherein the ratio of the odd order harmonic signal to the even order harmonic signal is independent of a filter input signal power.

11. The apparatus of claim 10, wherein the ratio of the odd order harmonic signal to the even order harmonic signal is given by:

$$r = \frac{4(v_L - v_0)}{v_d}$$

where $v_0$ represents a center frequency of the filter device, where $v_d$ represents an amplitude of the dither signal, where $v_L$ represents a frequency of the reference optical signal.

12. The apparatus of claim 1, wherein the detector device comprises one or more filters configured to filter the odd order harmonic signal and the even order harmonic signal.

13. The apparatus of claim 1, wherein the odd order harmonic signal comprises a first order harmonic signal, and the even order harmonic signal comprises a second order harmonic signal.

14. A tunable optical filter method comprising:
generating a filter driver signal, the filter driver signal comprising a dither signal;
receiving a filter input signal and the filter driver signal, the filter input signal comprising a reference optical signal and an optical input signal;
generating a filter output signal based on the filter input signal and the filter driver signal;
receiving a detector input signal, the detector input signal comprising at least a portion of the filter output signal;
generating a detector output signal, the detector output signal based on an odd order harmonic signal and an even order harmonic signal of the detector input signal based on a frequency of the dither signal;
receiving the detector output signal;
determining a ratio of the odd order harmonic signal to the even order harmonic signal;
comparing the ratio to a predetermined setpoint ratio; and
generating a control feedback signal for generating a new filter driver signal, the control feedback signal based on the comparison of the ratio of the odd order harmonic signal to the even order harmonic signal, to the predetermined setpoint ratio.

15. The method of claim 14, wherein the filter driver signal comprises an electrical filter driver signal.

16. The method of claim 14, further comprising receiving the portion of the filter output signal and converting the portion of the filter output signal to an electrical output signal.

17. The method of claim 16, further comprising receiving the electrical output signal, and inverting the electrical output signal.

18. The method of claim 14, further comprising generating the dither signal.

19. The method of claim 14, wherein the ratio of the odd order harmonic signal to the even order harmonic signal is independent of a filter input signal power.

20. The method of claim 19, wherein the ratio of the odd order harmonic signal to the even order harmonic signal is given by:

$$r = \frac{4(v_L - v_0)}{v_d}$$

where $v_0$ represents a center frequency of the filter device, where $v_d$ represents an amplitude of the dither signal, where $v_L$ represents a frequency of the reference optical signal.

* * * * *

UNITED STATES PATENT AND TRADEMARK OFFICE
CERTIFICATE OF CORRECTION

PATENT NO. : 8,139,281 B1
APPLICATION NO. : 12/690922
DATED : March 20, 2012
INVENTOR(S) : Leah Wang et al.

It is certified that error appears in the above-identified patent and that said Letters Patent is hereby corrected as shown below:

IN THE SPECIFICATION:

In Column 8, Lines 1-5: Replace "$r = \dfrac{(1/I_{out})_{1st}}{(1/I_{out})_{2nd}} = \cdot\dfrac{(v_L - v_0)}{v_d}$" with "$r = \dfrac{(1/I_{out})_{1st}}{(1/I_{out})_{2nd}} = 4 \cdot \dfrac{(v_L - v_0)}{v_d}$"

Signed and Sealed this
Third Day of July, 2012

David J. Kappos
*Director of the United States Patent and Trademark Office*